Nov. 12, 1929.    C. J. ASHBY    1,735,665
MEANS FOR PROPELLING COASTER WAGONS AND OTHER VEHICLES

Filed Aug. 16, 1928

Inventor:
Cassuis Jefferson Ashby

By        Atty

Patented Nov. 12, 1929

1,735,665

UNITED STATES PATENT OFFICE

CASSIUS JEFFERSON ASHBY, OF EVANSVILLE, INDIANA

MEANS FOR PROPELLING COASTER WAGONS AND OTHER VEHICLES

Application filed August 16, 1928. Serial No. 300,018.

The object of my invention is to provide simple, durable, inexpensive, and efficient, double-acting hand-operated means which can be applied to a child's coaster wagon, perambulator, or wheeled invalid chair, or other vehicle whereby the vehicle may be easily propelled by the occupant in a relatively smooth and even fashion and without requiring much exertion.

My improvements comprise a pair of reciprocatory racks suitably mounted on the wagon or other vehicle, a crank-axle for the propelling wheels of the vehicle, connecting rods which connect the racks to the cranks of the axle, a pinion meshing with both of the racks, and manually operable means for shifting one of the racks, the movement of the shifted rack being communicated to the other rack through the intermediate pinion. The cranks of the crank axle may be set in diametrically opposite arrangement to facilitate the evenness of the propulsion action thereon by the oppositely acting racks.

Figure 1:
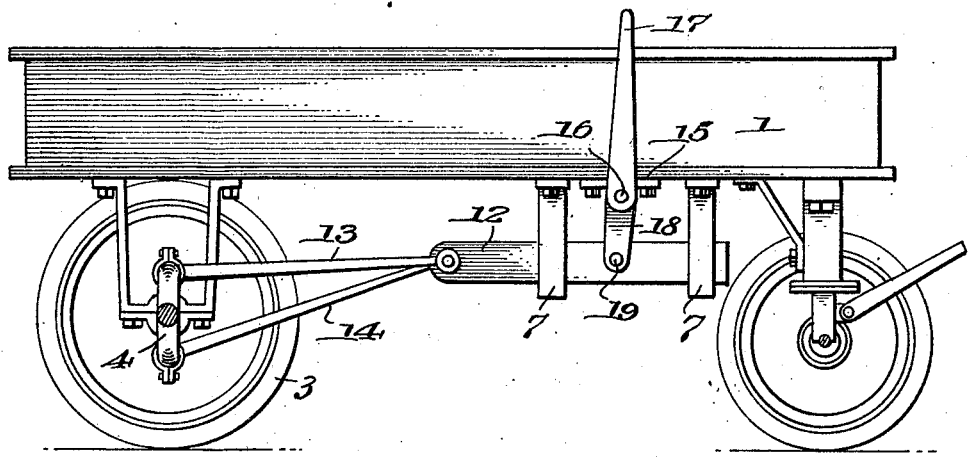
Figure 2:
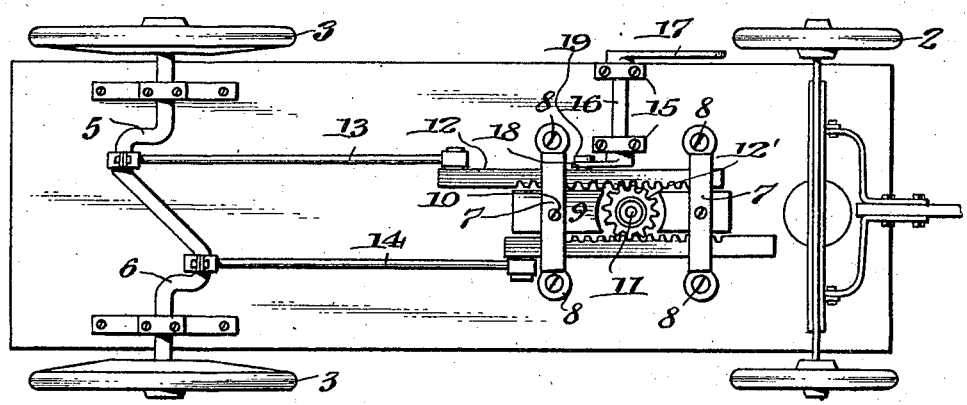

In the accompanying drawings:

Figure 1, is a side elevation of a coaster wagon provided with my improvements; and Fig. 2, is a bottom view thereof.

The wagon body appears at 1, the steering wheels and axle and tongue are shown at 2, and the propelling, rear, wheels appear at 3.

The rear wheels are carried by a crank axle 4 which has cranks 5, 6; as shown, these cranks are set at 180° apart so that the impulses of the mechanism now to be described, will result in a more or less substantially continuous application of the power to axle 4 and minimize manual effort required to propel the wagon.

Depending from the body 1 are hangers 7 which are suitably bolted or secured to the body as shown at 8. Secured to, and bridging, the hangers 7 is a center piece or filler 9 which is fastened to the hangers at 10. Journalled to the piece 9 at 11 is a pinion 12'.

In the hangers 7 and guided thereby and guided by the opposite sides of the filler block 9, are the oppositely reciprocating racks 12 which mesh with the pinion 11. The racks are connected to the cranks 5, 6 by connecting rods 13, 14.

Suitably journalled in bearings 15 connected to the body 1, is a shaft 16 which has a handle 17 and is provided with an arm 18 which is pivoted at 19 to one of the racks 12. The handle 17 is arranged conveniently to be grasped by the occupant of the wagon.

By pushing and pulling on the handle 17, the rack 12 is moved in one direction or the other and, through the medium of the pinion 12', an opposite movement is transmitted to the other rack 12. These to and fro movements of the racks 12 impart pushing and pulling impulses to the crank axle 4 to enable the wagon to be propelled.

By reason of the rack and pinion construction employed, a braking action can be had on the wheels 3, when desired, the operator resisting the tendency of the handle to move.

While the invention is described in connection with a coaster wagon such as used by children, the mechanism is well adapted for use in connection with perambulators and invalid chairs.

What I claim is:

1. Means for propelling coaster wagons and other vehicles comprising a crank axle, reciprocatory racks, connecting rods connecting the racks with the respective cranks of the axle, a pinion meshing with both of the racks, whereby the racks when actuated will travel in opposite directions, and a rock shaft having a manipulating lever and an arm which is connected to one of said racks.

2. Means for propelling coaster wagons and other vehicles comprising a crank axle, reciprocatory racks, connecting rods connecting the racks with the respective cranks of the axle, a pinion meshing with both of the racks, whereby the racks when actuated will travel in opposite directions, a rock shaft having a manipulating lever and an arm which is connected to one of said racks, hangers for guiding the racks, and a filler block connected to the hangers and interposed between the racks and serving as a guiding means therefor, said filler block carrying the aforesaid pinion.

In testimony whereof I affix my signature.

CASSIUS JEFFERSON ASHBY.